United States Patent
Wee et al.

(10) Patent No.: US 9,084,303 B2
(45) Date of Patent: Jul. 14, 2015

(54) DEVICE AND METHOD FOR DRIVING LEDS

(75) Inventors: Kai Fook Francis Wee, Singapore (SG); Andrea Stona, Bolzano (IT); Leopoldo Groppi, Milan (IT); Kwok Wing Man, Hong Kong (CN); Foo Wing Chong, Malaysia (MY)

(73) Assignee: Opulent Electronics International Pte. Ltd, Singapore (SG)

( * ) Notice: Subject to any disclaimer, the term of this patent is extended or adjusted under 35 U.S.C. 154(b) by 370 days.

(21) Appl. No.: 13/143,107

(22) PCT Filed: Jun. 4, 2010

(86) PCT No.: PCT/SG2010/000212
§ 371 (c)(1),
(2), (4) Date: Jan. 17, 2013

(87) PCT Pub. No.: WO2011/152795
PCT Pub. Date: Dec. 8, 2011

(65) Prior Publication Data
US 2013/0106304 A1    May 2, 2013

(51) Int. Cl.
*H05B 37/02* (2006.01)
*H02M 3/335* (2006.01)
(Continued)

(52) U.S. Cl.
CPC ........... *H05B 37/02* (2013.01); *H02M 3/33523* (2013.01); *H05B 33/0815* (2013.01); *H05B 33/0848* (2013.01); *H02M 2001/0012* (2013.01); *H02M 2001/0022* (2013.01)

(58) Field of Classification Search
CPC ........... H05B 33/0815; H05B 33/0803; H05B 33/0848; H05B 33/0842; H05B 41/3927
USPC ............... 315/291, 209 R, 219, 308, 360
See application file for complete search history.

(56) References Cited

U.S. PATENT DOCUMENTS 7,719,248 B1 *   5/2010   Melanson ................. 323/283
8,593,075 B1 *  11/2013   Melanson et al. ......... 315/291
(Continued)

FOREIGN PATENT DOCUMENTS

JP        11220876 A      10/1999
JP      2004206936 A       7/2004
(Continued)

OTHER PUBLICATIONS

PCT International Search Report; International Application No. PCT/SG2010/000212, Date Mailed July 29, 2010.

*Primary Examiner* — Douglas W Owens
*Assistant Examiner* — Borna Alaeddini
(74) *Attorney, Agent, or Firm* — MKG LLC

(57) ABSTRACT

In a device and method for providing electrical current to a Light Emitting diode (LED) via switch mode power converter, at least one Integrated Circuit (IC) is provided and uses a hardware description language; an electronic switch configurable to have a switching time period. An Analog to Digital converter (ADC) is configured to obtain a digitized voltage input. A voltage comparator is configured to obtain a discharge time of an inductive element of the switch mode power converter at each time period. During operation, the IC obtains the digitized voltage input, the discharge time of the inductive element, the desired electrical current, a reference constant, and the switching time period of the electronic switch as inputs and calculates the switch-on time of the electronic switch at each switching time period, so that the switch-on time of the electronic switch regulates the electrical current flowing into the LED.

19 Claims, 5 Drawing Sheets

(51) Int. Cl.
  *H05B 33/08*  (2006.01)
  *H02M 1/00*  (2007.01)

(56) References Cited

U.S. PATENT DOCUMENTS

| | | | |
|---|---|---|---|
| 8,723,438 B2* | 5/2014 | Melanson et al. | 315/209 R |
| 2006/0261754 A1* | 11/2006 | Lee | 315/291 |
| 2007/0024213 A1* | 2/2007 | Shteynberg et al. | 315/291 |
| 2007/0103949 A1* | 5/2007 | Tsuruya | 363/125 |
| 2007/0121349 A1 | 5/2007 | Mednik et al. | |
| 2007/0182346 A1* | 8/2007 | Shteynberg et al. | 315/308 |
| 2009/0058323 A1 | 3/2009 | Yang | |
| 2009/0134859 A1 | 5/2009 | Shiroyama | |
| 2012/0133295 A1* | 5/2012 | Pereira et al. | 315/210 |

FOREIGN PATENT DOCUMENTS

| | | |
|---|---|---|
| JP | 2008206271 A | 9/2008 |
| JP | 2009526365 A | 7/2009 |
| JP | 2010110190 A | 5/2010 |
| KR | 100954123 B1 | 4/2010 |
| WO | 201001599 A1 | 2/2010 |

* cited by examiner

DEVICE AND METHOD FOR DRIVING LEDS

FIELD OF THE INVENTION

The present invention relates to a device and method for driving light emitting diodes (LEDs) using switched mode power supply configuration. The invention is particularly suited for the design of a LED current controller and will be described in this context.

BACKGROUND TO THE INVENTION

The following discussion of the background of the invention is intended to facilitate an understanding of the present invention. However, it should be appreciated that the discussion is not an acknowledgement or admission that any of the material referred to was published, known or part of the common general knowledge in any jurisdiction as at the priority date of the application.

Light Emitting Diodes (LEDs) are often driven by controller circuits to fulfill one or more objectives. As LEDs are sensitive to current and voltage fluctuations, one of the most important objectives for LED controller circuits is to provide appropriate current to drive the LEDs under supply voltage or load variations.

Pulse-Width Modulation (PWM) based controllers have been developed to provide appropriate current to LEDs under supply voltage/load variations. Most PWM controllers are switched-mode based controllers involving the use of electronic switches such as MOSFET as a means for regulating the current input to the LEDs.

FIG. 1 illustrates a typical buck-boost LED controller used for an isolated AC application. The current driver circuitry is based on an analog PWM controller, which includes the use of current feedback resistors 13; opto-couplers 14; and polarized capacitors 12. The current driver circuitry further includes an analog PWM controller 15.

The PWM based controller circuit has several disadvantages listed as follows:

As the current-sense feedback resistors 13 are in the current path of the power MOSFET and the LEDs, it dissipates a lot of electrical energy. This is a loss of electrical energy as the feedback resistors 13 consume electrical energy (which is dissipated as heat) which is not producing useful work. Moreover, such feedback resistors 13 are typically power resistors which generate considerable heat and generally require thicker copper design when implemented on a printed circuit board (PCB). This increases the overall cost of implementation.

The lifetime of the polarized capacitors 12 is typically much shorter than the lifetime of the LEDs. When one or more polarized capacitors 12 break down, they lead to short circuits which may further cause the malfunctioning of the driver circuitry. Such malfunctioning is likely to shorten the lifetime of the LEDs due to a cascading malfunctioning effect.

The polarized capacitors 12 further introduce phase differences in the circuit which decreases power factor and the overall useful electrical power efficiency.

The opto-couplers 14 are typically expensive electrical components which will increase the overall cost of implementing the LED controller.

In addition to the above disadvantages, the Applicant submits that generic PWM controllers (whether analogue or digital) work based on fixed/narrow frequencies range and does not ensure that the controller is working in a discontinuous mode when the operating frequency changes.

It is thus an object of the invention to overcome, or at least ameliorate in part, one or more of the aforementioned problems.

SUMMARY OF THE INVENTION

Throughout this document, unless otherwise indicated to the contrary, the phrase "comprising", "consisting of" and the like, are to be construed as inclusive and not exhaustive.

In accordance with a first aspect of the present invention there is a device for providing electrical current to at least one Light Emitting diode (LED) via a switch mode power converter comprising: at least one Integrated Circuit (IC), the IC programmable using a hardware description language; an electronic switch configurable to have a switching time period; an Analogue to Digital converter (ADC), the ADC configured to obtain a digitized voltage input; a voltage comparator, the voltage comparator configured to obtain a discharge time of an inductive element of the switch mode power converter at each time period; wherein in operation, the at least one IC is configured to obtain the digitized voltage input, the discharge time of the inductive element, the desired electrical current, a reference constant value, and the switching time period of the electronic switch as inputs and therein calculate the switch-on time of the electronic switch at each switching time period, so that the switch-on time of the electronic switch regulates the electrical current flowing into the at least one LED.

Preferably, the at least one IC is an application-specific integrated circuit (ASIC).

Preferably, the switch-on time of the electronic switch is calculated according to the following formula:

$$T_{ON} = \frac{I_{OUT} * T}{K * V_{IN} * T_{OFF}}$$

Where $T_{ON}$ is the switch-on time of the electronic switch, $I_{OUT}$ is the desired electrical current; T is the switching time period of the electronic switch; K is the reference constant value; $T_{OFF}$ is the discharge time of the inductive element of the switch mode power and $V_{IN}$ is the digitalized voltage input.

Preferably, for an isolated alternating current (AC) fly back configuration having the inductive element as a transformer isolating the at least one LED at the secondary end of the transformer, the reference constant K is calculated according to the following formula:

$$K = \frac{1}{2 * \sqrt{L_1 * L_2}}$$

wherein $L_1$ is the inductance value of the primary winding of a transformer and $L_2$ is the inductance value of the secondary winding of the transformer. Preferably, the transformer is a planar transformer.

Alternatively, for a non-isolated direct current (DC) fly back configuration, the reference constant value K is calculated according to the following formula:

$$K = \frac{1}{L_3}$$

wherein $L_3$ is the inductance value of the inductive element in the fly back configuration.

Preferably, the value of $T_{ON}$ is updated at each time period based on comparing an value A with a value B; the formulas of A and B are respectively:

$$A = V_{IN} * T_{ON} * T_{OFF};\text{ and}$$

$$B = 1/K * I_{OUT} * (T_{ON} + T_{OFF} + T_{CALC})$$

Wherein $T_{CALC}$ is the time after the discharge time of the inductive element to compute the formula and the switching time period of the electronic switch is the summation of $T_{ON}$, $T_{OFF}$ and $T_{CALC}$; such that when the value of A is greater than B, the value of $T_{ON}$ is decreased by a predetermined number of clock cycles; when the value of A is smaller than B, the value of $T_{ON}$ is increased by the predetermined number of clock cycles; and when the value of A is equals to B, no change is made to $T_{ON}$.

Preferably, the device configured for adjustment of the electrical current as a function of temperature by means of a thermistor positioned at the junction of each LED; the device further configured to update the electrical current output via updating the predetermined number of clock cycles.

Preferably, the electronic switch is a metal-oxide-semiconductor field-effect transistor (MOSFET), and in operation, the MOSFET is configured to work in a discontinuous mode.

Preferably, the ADC, voltage comparator and oscillator are integrated into the IC.

In accordance with a second aspect of the present invention there is a method for providing electrical current to at least one Light Emitting Diode (LED) via a switch mode power converter comprising the steps of:

(i) obtaining (a) a digitized voltage input; (b) a switching time period of an electronic switch; (c) a discharge time of an inductive element of the switch mode power converter; (d) the desired value of the electrical current; and (e) a digital reference as inputs and (ii) calculating a switch-on time of the electronic switch at each switching time period;

(iii) regulating the electrical current flowing into the at least one LED at each switching time period based on the switch-on time of the electronic switch; and (iv) repeating steps (i) to (iii) for each switching time period.

Preferably, the switch-on time of the electronic switch is calculated according to the following formula:

$$T_{ON} = \frac{I_{OUT} * T}{K * V_{IN} * T_{OFF}}$$

Wherein $I_{OUT}$ is the desired electrical current; T is the switching time period of the electronic switch; K is a reference constant; $T_{OFF}$ is the switch-off time of the electronic switch at each switching time period and $V_{IN}$ is the digitized voltage input.

Preferably, for an isolated alternating current (AC) source input having a transformer isolating the at least one LED to the secondary end of the transformer, the constant gain value K is calculated according to the following formula:

$$K = \frac{1}{2 * \sqrt{L_1 * L_2}}$$

wherein $L_1$ is the inductance value of the primary winding of a transformer and $L_2$ is the inductance value of the secondary winding of the transformer.

Alternatively, for a non-isolated direct current (DC) fly-back configuration, the reference constant K is calculated according to the following formula:

$$K = \frac{1}{L_3}$$

wherein $L_3$ is the inductance value of an inductive element in the fly-back configuration.

Preferably, the value of $T_{ON}$ is updated based on comparing a value A with a value B; the formulas of A and B are respectively:

$$A = V_{IN} * T_{ON} * T_{OFF};\text{ and}$$

$$B = 1/K * I_{OUT} * (T_{ON} + T_{OFF} + T_{CALC})$$

Wherein $T_{CALC}$ is the time after the discharge time of the inductive element to compute the formula and the switching time period of the electronic switch is the summation of $T_{ON}$, $T_{OFF}$ and $T_{CALC}$; such that when the value of A is greater than B, the value of $T_{ON}$ is decreased by a predetermined number of clock cycles; when the value of A is smaller than B, the value of $T_{ON}$ is increased by the predetermined number of clock cycles; and when the value of A is equals to B, no change is made to $T_{ON}$.

BRIEF DESCRIPTION OF THE DRAWINGS

The following invention will be described with reference to the following drawings of which.

Other arrangements of the invention are possible and, consequently, the accompanying drawings are not to be understood as superseding the generality of the preceding description of the invention.

DETAILED DESCRIPTION

In context of the description, the term 'current' will generally be understood to mean 'electrical current' unless otherwise indicated.

Figure 2:
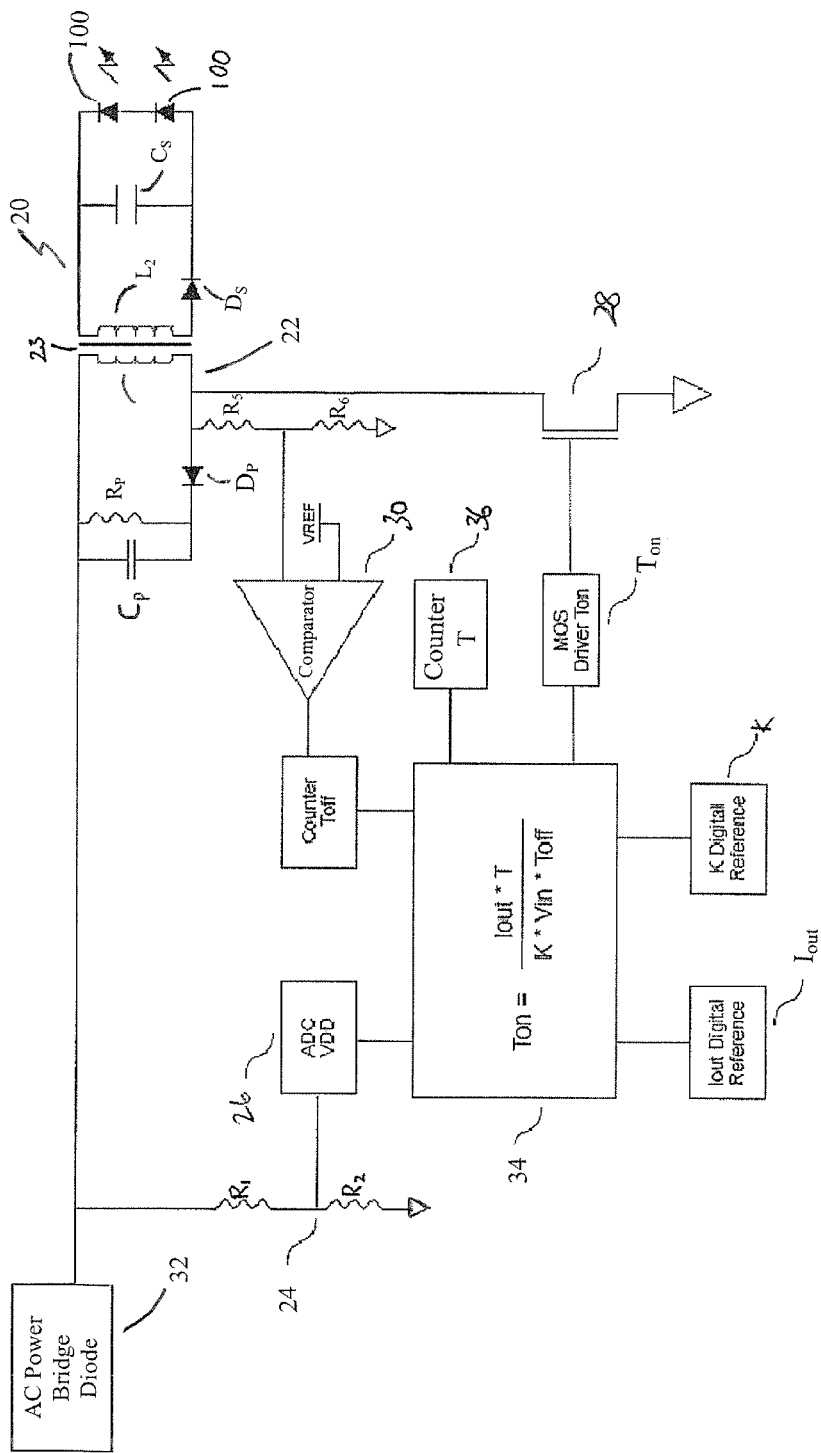
FIG. 2 illustrates a configuration of the LED driver circuit in accordance with the first embodiment of the invention for isolated alternating current (AC) application.

In accordance with the first embodiment of the invention shown in FIG. 2 there is a device for providing electrical current to at least one Light Emitting diode 20. The device is a LED driver 20 for an isolated alternating current (AC) application. The LED driver comprises transformer 23, flyback converter 22, voltage divider 24, Analog-to-digital converter (ADC) 26, electronic switch 28, voltage comparator 30, bridge rectifier 32, Integrated circuit (IC) 34 and an electronic oscillator 36.

Transformer 23 is an isolation transformer. Transformer 23 decouples a LED load 100 from the rest of the circuitry. Each LED 100 is connected in series with other LEDs 100. The winding ratio of transformer 23 is configured according to the number of LEDs in LED load 100. Transformer 23 may be a planar transformer or other low-loss transformers as known to a person skilled in the art.

Resistor $R_P$ and capacitor $C_P$ are connected in a parallel configuration with the primary end of the transformer 23. A diode $D_P$ is connected to the Resistors $R_P$, capacitor $C_P$, and the transformer 23. The conducting end of the diode $D_P$ is connected in a series configuration to the primary end of the transformer 23. The non-conducting end of the diode $D_P$ is connected in series configuration to the resistor $R_P$ and capacitor $C_P$.

A capacitor $C_S$ is connected in parallel to the secondary end of the transformer 23. A diode $D_S$ is connected to the secondary end of the transformer 23 and the capacitor $C_S$. The conducting end of the diode $D_S$ is connected to the secondary end of the transformer 23 in a series configuration. The non-conducting end of the diode $D_S$ is connected to the capacitor $C_S$ in a series configuration. The LED load 100 is connected in a parallel configuration to the capacitor $C_S$.

Voltage divider 24 comprises a series of standard resistors. For illustration, voltage divider 24 is represented using standard resistors $R_1$, $R_2$. For an AC supply voltage of 230 VAC, the resistance value for $R_1$ is about 300 kΩ and for $R_2$ is about 2.2 kΩ. During operation, the voltage between $R_1$ and $R_2$ is tapped by ADC 26. The tapped voltage is converted to a digital value $V_{DD}$. One end of $R_2$ is connected to electrical ground.

The ADC 26 is suited to operate in the range of 50 to 120 Hz. In order for the embodiment to work, the minimum resolution of the ADC 26 should be 8-bit. The digitized voltage of the ADC 26 may also be used as an under-voltage security lock.

Electronic switch 28 is typically a power transistor. In this particular embodiment, electronic switch 28 is a MOSFET. The drain of the electronic switch 28 is connected to the conducting end of the diode D. The gate of the electronic switch 28 is connected to the output pin of the IC 34, and the source of the electronic switch 28 is connected to the electrical ground.

Voltage comparator 30 is connected to the primary end of the transformer 23 via a resistor $R_5$. Resistor $R_5$ is in turn connected in a series configuration with resistor $R_6$. When in operation, voltage comparator 30 obtains the voltage between resistor $R_5$ and resistor $R_6$. The obtained voltage is compared with a voltage reference $V_{REF}$. $V_{REF}$ is typically configured to be the same value as $V_{DD}$. Voltage comparator 30 is typically (but not limited to), an operational-amplifier.

The bridge rectifier 32 is configured to provide a rectified output from the AC mains. The AC mains may be either 110 VAC or 230 VAC.

The IC 34 is typically an Application Specific Integrated Circuit (ASIC). In this regard, it is to be appreciated that ADC 26, voltage comparator 30, electronic oscillator 36 may be integrated with IC 34. In addition, IC 34 may further comprise Regulators, Power-on-reset, MOSFET driver, One-time programmable (OTP) memory, EEPROM, Flash and/or other programmable memory blocks as known to a person skilled in the art. IC 34 may be programmed using hardware description language (HDL) such as Verilog, VHDL, or other hardware description language as known to a person skilled in the art.

Figure 5:
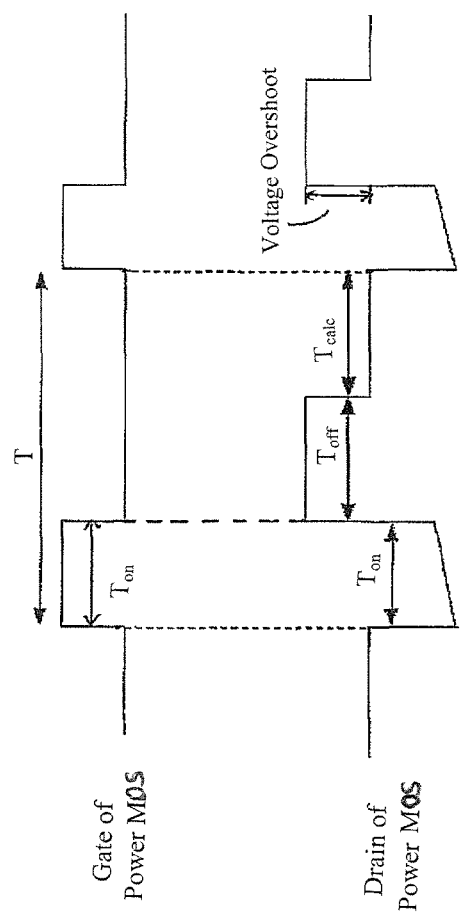
FIG. 5 illustrates possible waveforms at the gate and drain of a MOSFET in accordance with the first and second embodiment embodiments of the invention.

The IC 34 is programmed and configured to receive five inputs; i.e.
  (a.) A reference constant K;
  (b.) Desired reference current $I_{OUT}$;
  (c.) The digitized voltage value $V_{DD}$ obtained from the ADC 26;
  (d.) A time value $T_{OFF}$ of the discharge of the core of transformer 23 measured through voltage comparator 30; and
  (e.) A switching period T (i.e. the switching period of the electronic switch 28) as illustrated in FIG. 5.

In relation to the switching period of the electronic switch 28, the electronic oscillator 36 generates an operating frequency of 20 MHz, i.e. at a time period of 50 nano seconds. The switching time of the switch mode power supply (SMPS) is related to the on/off of the electronic switch 28. In the context of this embodiment, the switching time of the SMPS ranges from 30 kHz to 300 kHz.

Using the received five inputs, the IC 34 computes an output $T_{ON}$ to drive the gate of the electronic switch 28 in accordance with formula 1.

$$T_{ON} = \frac{I_{out} * T}{K * V_{in} * T_{off}} \tag{1}$$

Where $T_{ON}$ is the switch-on time of the electronic switch 28, $I_{OUT}$ is the desired reference current; T is the switching time period of the electronic switch 28; K is the reference constant; $T_{OFF}$ is the discharge time of the transformer 23 and $V_{IN}$ is the digitalized voltage input.

The reference constant K is calculated based on the inductance value of the primary and secondary windings of the transformer 23 as described in formula 2.

$$K = \frac{1}{2 * \sqrt{L_1 * L_2}} \tag{2}$$

where $L_1$ is the inductance value of the primary windings of the transformer 23 and $L_2$ is the inductance value of the secondary windings of the transformer 23. The value of reference K is stored in a memory within the IC 34, the memory may be one-time programmable (OTP), flash or EEPROM. Alternatively the reference K may be hardcoded in the formula, i.e. the value of reference K is stored inside the IC 34 as registers, in which case the K value may not be updated during operation.

The electronic oscillator 36 (20 MHz frequency, 50 ns period) is coupled with an internal 10 bit counter to count $T_{ON}$ and $T_{OFF}$. The 10 bit counter translates to 1024 clock cycles before overflow). This means that with the 10 bit internal counter, the 1024 clock cycles may be counted within 50 ns*1024=51.2 μs. Hence, the counter is capable for counting between 19.53125 kHz up to 20 MHz. It is to be appreciated that the switching time T of the electronic switch 28 of 30 kHz to 300 kHz falls within the above range. The digital reference current $I_{OUT}$ fixes the desired output current to drive the LEDs. The value of digital reference current $I_{OUT}$ may be either stored in the memory of IC 34 or hardcoded in the formula, in which case the digital reference value $I_{OUT}$ may not be updated during operation.

The embodiment will next be described in the context of its operation. As an illustration (and not meant to be exclusive), a voltage input of 230VAC is entered to drive the LED driver 20. Eighteen LEDs 100 are connected in series with each other. The eighteen LEDs 100 form the LED load.

FIG. 5 illustrates typical voltage-time waveforms at the gate and drain of the electronic switch 28 when the LED driver 20 is in operation. A voltage overshoot at the drain of electronic switch 28 is measured. The voltage overshoot is proportional to the voltage across the LEDs 100. The voltage overshoot value is used to measure the time of core discharge $T_{OFF}$ using the voltage comparator 30 and a digital counter. The value of $T_{OFF}$ is measured based on the time of the core discharge of the primary end of the transformer 23.

During operation, $V_{REF}$ is configured to be the same voltage reference of the input voltage $V_{DD}$ as sampled by the ADC 26. Such a configuration ensures that the electronic switch 28 is consistently working in discontinuous mode.

Figure 4:
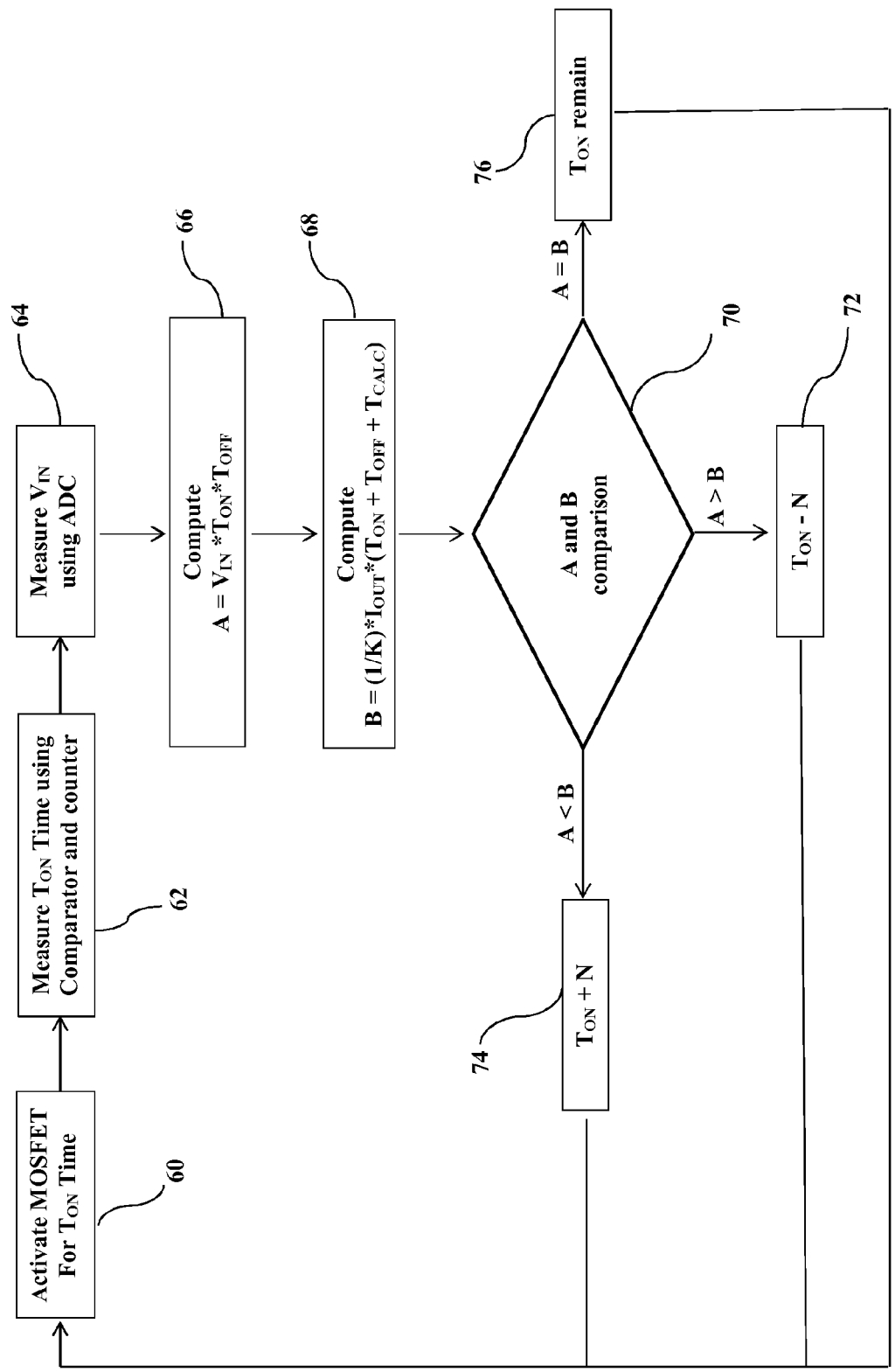
FIG. 4 illustrates a flow chart for implementation of the digital algorithm in accordance with the first and second embodiment of the invention.

The value of $T_{ON}$ is fine-tuned iteratively in accordance to the flow chart illustrated in FIG. 4 such that over a period (of clock cycles), the electrical current flowing into the LED load 100 is regulated by adjusting $T_{ON}$. The steps are described in the flow chart are described as follows:

The electronic switch 28 is activated for $T_{ON}$ time. (Step 60)

The $T_{OFF}$ timing is computed based on the voltage comparator 30 and digital counter (Step 62)

A value $V_{IN}$ ($V_{IN}=V_{DD}$) is obtained from the ADC 26 (digitized value) (Step 64)

Formula (3) is computed as follows: (Step 66)

$$A = V_{IN} * T_{ON} * T_{OFF} \quad (3)$$

Formula (4) is computed as follows: (Step 68)

$$B = 1/K * I_{OUT} * (T_{ON} + T_{OFF} + T_{CALC}) \quad (4)$$

wherein $T_{CALC}$ is the time after the discharge to compute the formula.
such that the switching period T of the electronic switch 28 is the summation of $T_{ON}$, $T_{OFF}$ and $T_{CALC}$.

The actual implementation takes approximately 128 clock cycles.

The value of A and B are compared (Step 70).

If A is greater than B, i.e. A>B, then $T_{ON}$ is adjusted to $T_{ON}$−N for the next time period T (Step 72).

If A is smaller than B, i.e. A<B, then $T_{ON}$ is adjusted to $T_{ON}$+N (Step 74).

In the situation where A is equals to B, there is no updating of $T_{ON}$ and $T_{ON}$ remains unchanged (Step 76).

The value N is an adjustment value. N is the increment or decrement of the switch-on time $T_{ON}$ of the MOSFET. The adjustment value N forms part of the feedback loop for stabilizing current $I_{OUT}$. The value of N typically ranges between 1 and 128 number of clock cycles.

It is to be appreciated that for different differences of A and B, different values of N are used.

It is to be further appreciated that A and B is computed separately due to the complexity of performing hard-coded division, which is time-consuming and inefficient for this application. To overcome the problem, algebraic manipulation is used to compute the formulas (3) and (4) and therein compare the results between A and B.

The process Step 60 to 76 repeats itself until the circuit is switched off or according to other terminating condition as known to a person skilled in the art.

The $T_{OFF}$ value may further be configured for short circuit protection of the LED load 100. For the purpose of short circuit protection, the $T_{OFF}$ value is compared with a short circuit reference value $T_{OFF,SC}$. If a short circuit is present on the secondary winding of the transformer 23, where the LED load 100 is, the $T_{OFF}$ value will be shorter than the short circuit reference value $T_{OFF,SC}$, thereby activating the short circuit protection.

Figure 1:
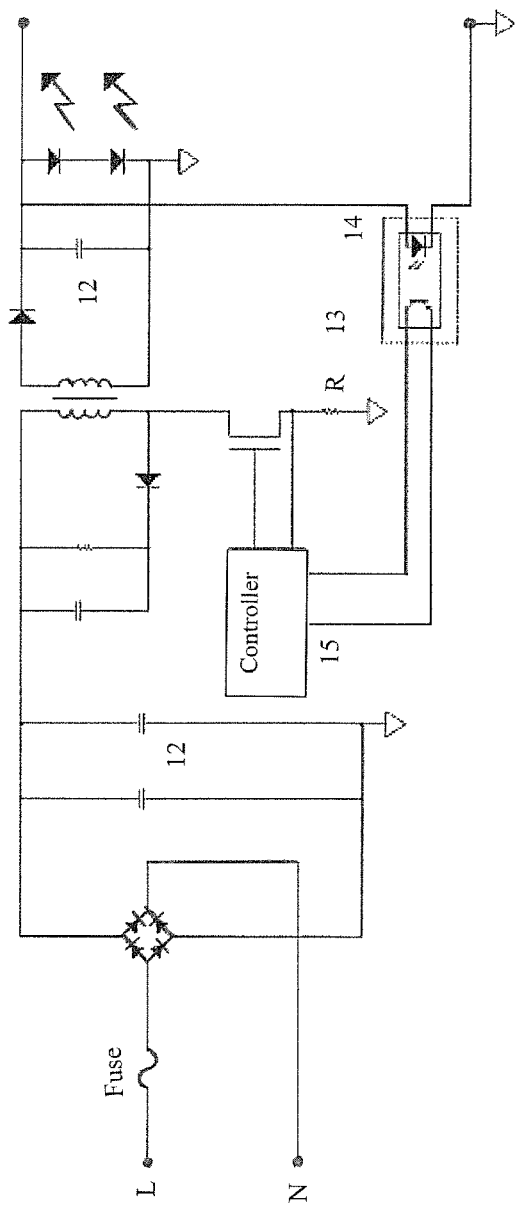
FIG. 1 illustrates a prior art LED current controller circuit.

The Applicant has discovered that the use of the ASIC and the implementation of formula (1) to (4) are independent from the number of LEDs in the load. The implementation of the ASIC further omit the need for polarized capacitors on the main power supply, polarized capacitors with larger capacitance on the secondary windings of transformer 23, feedback power resistors on the MOSFET and on the LED chain/load. The total efficiency (as well as power factor correction) of the system will thus increase as majority of the electrical power will be transferred to the LEDs instead of to the feedback resistors and capacitors. In addition, the cost of implementing the circuitry is typically lower than the prior art circuitry as described in FIG. 1, as the components used generally lower in cost as compared to specific components such as optocouplers 14 (thereby omitting the need for voltage feedback on the secondary end of transformer 23) and polarized capacitors.

In the above example, with eighteen LEDs (each LED 100 having a forward voltage of 3.2V) and an input of 230 VAC and a reference output current $I_{OUT}$ of 350 milli-amperes (mA), an efficiency of as high as 94% is achieved. This is based on obtained demo-board simulation results, where the system power consumption is 21.5 W. The total LED power consumption is 20.16 W such that the efficiency is 20.16 divided by 21.5, i.e. 93.8%.

In addition, for the purpose of short circuit protection, if one LED 100 is shorted the formulas (1) to (4) are capable of adapting the value of $T_{ON}$ to provide the right current to the working LEDs via the feedback mechanism described in Step 60 to 76. The driver 20 is thus independent from the number of LEDs present on the secondary end of the transformer 23 (i.e. the load side).

An additional security option is done computing the $T_{ON}$ multiplied by the $V_{IN}$ value. In order not to saturate the transformer core $L_1$, $L_2$ this value must be under a digital threshold value $T_{ON,MAX}$. The digital threshold value $T_{ON,MAX}$ is calculated as Formula (5), assuming that the core saturates at 0.3 Tesla:

$$T_{ON,MAX} = (N_P * 0.3 * A_E)/(V_{IN}) \quad (5)$$

Where $N_P$ is the number of primary windings, $A_E$ is the effective area of the transformer, $V_{IN}$ is the input voltage.

Figure 3:
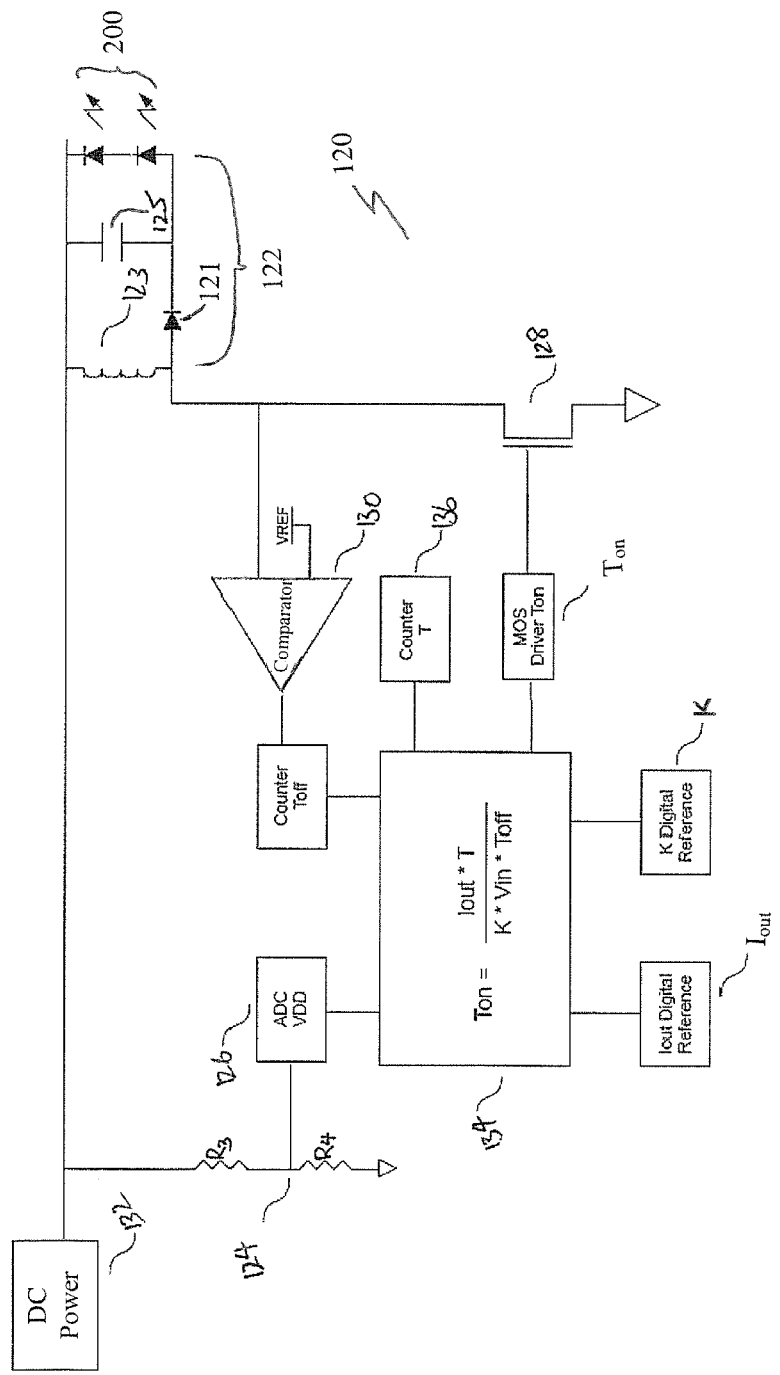
FIG. 3 illustrates a configuration of the LED driver circuit in accordance with the second embodiment of the invention for non-isolated direct current (DC) application.

In accordance to the second embodiment of the invention as shown in FIG. 3 there is a device for providing electrical current to at least one Light Emitting diode 120. The device is an LED driver 120 for a non-isolated DC application. The LED driver comprises fly-back converter 122, voltage divider 124, Analog-to-digital converter (ADC) 126, electronic switch 128, voltage comparator 130, DC power supply 132 and an Integrated circuit chip (IC) 134 and electronic oscillator 136.

Fly-back converter 122 comprises a diode 121 connected in a series configuration with inductor 123 and capacitor 125. Inductor 123 and capacitor 125 are configured to be in a parallel configuration with the LED load 200. Each LED 200 is connected in series to other LEDs 200. The conducting end of the diode 121 is connected to the inductor 123. The non-conducting end of the diode 121 is connected to the capacitor 125.

Voltage divider 124 comprises a series of standard resistors. For illustration, voltage divider 124 is represented using standard resistors $R_3$, $R_4$. The voltage between $R_3$ and $R_4$ is tapped by ADC 126 during operation. At a DC voltage of 12V, the value of $R_3$ and $R_4$ are about 47 kΩ and 4.7 kΩ respectively. One end of $R_4$ is connected to electrical ground.

The ADC 126 operates in the range of 50 to 120 Hz. In order for the embodiment to work, the minimum resolution of the ADC 126 is 8-bit. The digitized voltage of the ADC 126 may be used as an under-voltage security lock. The tapped voltage between $R_3$ and $R_4$ is converted to a digital value $V_{DD}$.

Electronic switch 128 is typically a power transistor. In this particular embodiment, electronic switch 128 is a MOSFET. The drain of the electronic switch 128 is connected to the conducting end of the diode 121 and the inductor 123. The gate of the electronic switch 128 is connected to the output pin of the IC 134, and the source of the electronic switch 128 is connected to the electrical ground.

Voltage comparator 130 compares the voltage obtained at the drain of the electronic switch 128 with a voltage reference $V_{REF}$. Voltage comparator 130 is typically (but not limited to), an operational-amplifier.

The DC power supply 132 is configured to provide a DC output to the circuit. The DC output may range from 3V to 400V.

The IC 134 is typically an Application Specific Integrated Circuit (ASIC). In this regard, it is to be appreciated that ADC 126, voltage comparator 130, electronic oscillator 136 may be integrated with IC 134. In addition, IC 134 may further comprise a Regulators, Power-on-reset, MOSFET driver, OTP memory, EEPROM, Flash and/or other programmable memory blocks as known to a person skilled in the art. IC 134 may be programmed using hardware description language (HDL) such as Verilog, VHDL, or other hardware description language as known to a person skilled in the art.

The IC 134 is programmed and configured to receive five inputs; i.e.
(a.) A reference constant K;
(b.) Desired reference current $I_{OUT}$;
(c.) The digitized voltage value $V_{DD}$ obtained from the ADC 126;
(d.) A time value $T_{OFF}$ of the core discharge of the inductor 123; and
(e.) A switching period T, the switching period of the electronic switch 28 obtained from electronic oscillator 136.

The electronic oscillator 136 generates an operating frequency of 20 MHz, i.e. a time period of 50 nano seconds. The switching time of the switch mode power supply (SMPS) is related to the on/off of the electronic switch 128. In the context of this embodiment, the switching time of the SMPS ranges from 30 kHz to 300 kHz.

Using the received five inputs, the IC 134 computes an output $T_{ON}$ to drive the gate of the electronic switch 128 in accordance with formula 1.

The reference constant K is calculated based on the discharge time of the inductor 123 as described in formula 6.

$$K = \frac{1}{L_3} \quad (6)$$

where $L_3$ is the inductance value of the inductor 123. The reference K is a digital value and could be stored in a memory within the IC 134, the memory could be OTP, flash or EEPROM. or hardcoded in the formula, in which case the digital value is stored inside the ASIC 134 as registers; thus the digital value may not be changed during operation.

The electronic oscillator 136 (20 MHz frequency, 50 ns period) is coupled with an internal 10 bit counter to count $T_{ON}$ and $T_{OFF}$. The 10 bit counter translates to 1024 clock cycles before overflow). This means that with the 10 bit internal counter, the 1024 clock cycle may be counted within 50 ns*1024=51.2 μs. Technically speaking, the counter is capable for counting between 19.53125 kHz up to 20 MHz. Thus the switching time T of the electronic switch 128 of 30 kHz to 300 kHz falls within the above range.

The embodiment will next be described in the context of its operation.

FIG. 5 illustrates typical voltage-time waveforms at the gate and drain of the electronic switch 128 when the LED driver 120 is in operation. A voltage overshoot at the drain of electronic switch 128 is measured. The voltage overshoot value is used to measure the time of core discharge $T_{OFF}$ using the voltage comparator 130 and a digital counter. The value of $T_{OFF}$ is measured based on the discharge time of the inductor 123. This is easily obtained via various methods as known to a person skilled in the art.

During operation, $V_{REF}$ is configured to be the same voltage reference of the input voltage $V_{DD}$ as sampled by the ADC 126. This configuration ensures that the electronic switch 128 is consistently working in discontinuous mode.

The value of $T_{ON}$ is fine tuned iteratively in accordance with the flow chart as illustrated earlier in FIG. 4. The process Step 60 to 76 repeats itself until the circuit is switched off or according to other terminating condition as known to a person skilled in the art.

The $T_{OFF}$ value may further be configured for short circuit protection of the LEDs 200. In this regard, the $T_{OFF}$ value is compared with a short circuit reference value $T_{OFF,SC}$. If a short circuit is present on the secondary winding of the transformer 23, where the LEDs 200 are, the $T_{OFF}$ value will be shorter than the short circuit reference value, thereby activating the short circuit protection.

The digital reference $I_{OUT}$ fixes the desired output current to drive the LEDs. The value of digital reference $I_{OUT}$ is stored in the memory of IC 134 or hardcoded in the formula.

During operation, the value of $T_{ON}$ is fine-tuned iteratively in accordance to the flow chart illustrated in FIG. 4. The steps 60 to 74 are described as mentioned earlier. Steps 60 to 74 repeats itself until the circuit is switched off or according to other terminating condition as known to a person skilled in the art.

The $T_{OFF}$ value may further be configured for short circuit protection of the LED load 200. For the purpose of short circuit protection, the $T_{OFF}$ value is compared with a short circuit reference value $T_{OFF,SC}$. If a short circuit is present on the inductor 123, where the LED load 200 is, the $T_{OFF}$ value will be shorter than the short circuit reference value $T_{OFF,SC}$, thereby activating the short circuit protection.

The digital reference $I_{OUT}$ fixes the desired output current to drive the LEDs. The value of digital reference $I_{OUT}$ may be either stored in the memory of IC 134 or hardcoded in the formula, in which case the digital reference value $I_{OUT}$ may not be updated during operation.

In addition, for the purpose of short circuit protection, if one LED 200 is shorted the formulas (1), (3), (4), (6) are capable of adapting the value of $T_{ON}$ to provide the right current to the working LEDs via the feedback mechanism described in Step 60 to 76. The driver 120 is thus independent from the number of LEDs 200 present.

An additional security option is done computing the $T_{ON}$ multiplied by the $V_{IN}$ value. In order not to saturate the inductor 123 this value must be under a digital threshold value $T_{ON,MAX}$. The digital threshold value $T_{ON,MAX}$ is calculated as illustrated in Formula (5), assuming that the core saturates at 0.3 Tesla:

With respect to both the embodiments, the Applicant observes that as the current is adjusted iteratively and based on the implementation of the ASIC programming, it is easy to dim the LED loads 100, 200 using the present circuitry without additional components. Thus, it is to be appreciated that dimming may be achieved via adjusting the current reference value $I_{OUT}$.

It is to be further appreciated that if a user wishes to switch off the device under both the embodiments as described, he may simply do so by inputting the current reference value $I_{OUT}$ to 0. The same user may switch on the device if he put a different value other than 0 in the $I_{OUT}$ register.

Further, the drivers 20, 120 may be configured for direct monitoring and adjustment of current as a function of temperature. In this regard, a thermistor may be positioned at the junction of each LED so that the controller may be adapted to auto update a different current output (via updating the value of N) for the LED loads 100, 200 based on the junction temperature sensed. This ensures that the LEDs 100, 200 are not over heated. Such a strategy will lengthen the life span of the LEDs 100, 200.

The above feature may be easily implemented via an additional enable pin on the ASIC 34, 134 as known to a person skilled in the art.

By way of an example of the thermistor-based monitoring, if there are five white LEDs and one red LED connected in a series configuration, the thermistor may be positioned adjacent to the red LED (due to the fact that the red LED has the lower critical temperature as compared to white LEDs). Care should however be taken such that the red LED is positioned at a location where heat dissipation could take place readily. In this way, as soon as the critical temperature of the red LED is reached, the IC (ASIC) 34, 134 decrease the current to the LED load.

For illustration, when the junction temperature of the red LED reaches 60 degree Celsius, the IC 34, 134 will adjust the current to decrease by 10% (e.g. 300 mA). When the junction temperature of the red LED reaches 65 degree celsius, the IC 34, 134 will adjust the current to decrease by 30% (250 mA); and when the junction temperature of the red LED is decreased to 55 degree Celsius, the IC 34, 134 will resume the current to full load (350 mA).

It should be appreciated by the person skilled in the art that the invention is not limited to the examples described. In particular, the following additions and/or modifications can be made without departing from the scope of the invention:

Field-programmable gate array (FPGA) can be used as an alternative to ASIC as known to a person skilled in the art.

While the existing embodiments illustrate the LEDs loads 100, 200 in the series configuration, the LEDs loads 100, 200 may be arranged in a parallel configuration as known to a person skilled in the art, such that the driven current $I_{OUT}$ is the average of the current in each single parallel chain.

The IC 34, 134 may be further configured to have more inputs for other purposes; and not be limited to five inputs.

The adjustment value N as mentioned in step 74 is the increment or decrement of the switch on time $T_{ON}$ of the MOSFET and may forms part of the stabilization filter loop. Typically the bigger the difference between A and B the bigger the value of N applied. As an example of a range, a ratio of 20 to 1 in terms of clock cycle is applied for AC/DC and from 5 to 1 in DC/DC.

A 'Wake-up function' may be incorporated into the LED drivers 20, 200 via using motion sensor with digital interface or analog threshold.

Although the LED drivers 20, 200 as presented in the first and second embodiments described the invention being applied to a fly-back converter configuration, it is to be appreciated that the IC 34, 134 and the formulas (1) to (6) are applicable to general switch mode power supplies including buck-boost converters, buck converters and boost converters (both isolated AC and non-isolated DC configurations).

The formulas (1) to (6) is not limited to the frequency generated by the electronic oscillator 36. In general, the higher the frequency generated, the bigger the design required for implementation; conversely the lower the frequency, the less precision on the current control. In this regard, 20 MHz is a good compromise between precision and implementation.

It should be further appreciated by the person skilled in the art that features and modifications discussed above, not being alternatives or substitutes, can be combined to form yet other embodiments that fall within the scope of the invention described.

What is claimed is:

1. A device for providing electrical current to at least one Light Emitting diode (LED) via a switch mode power converter comprising:
    at least one Integrated Circuit (IC), the IC programmable using a hardware description language;
    an electronic switch configurable to have a switching time period;
    an Analogue to Digital converter (ADC), the ADC configured to obtain a digitized voltage input;
    a voltage comparator, the voltage comparator configured to obtain a discharge time of an inductive element of the switch mode power converter at each time period;
    wherein in operation, the at least one IC is programmed to obtain the digitized voltage input, the discharge time of the inductive element, the desired electrical current, a reference constant, and the switching time period of the electronic switch as inputs and thereafter calculate a switch-on time of the electronic switch at each switching time period, so that the switch-on time of the electronic switch regulates the electrical current flowing into the at least one LED.

2. The device according to claim 1, wherein the at least one IC is an application-specific integrated circuit (ASIC).

3. The device according to claim 2, wherein the switch-on time of the electronic switch is calculated according to the following formula:

$$T_{ON} = \frac{I_{OUT} * T}{K * V_{IN} * T_{OFF}}$$

where $T_{ON}$ is the switch-on time of the electronic switch, $I_{OUT}$ is the desired electrical current; T is the switching time period of the electronic switch; K is the reference constant; $T_{OFF}$ is the discharge time of the inductive element of the switch mode power converter and $V_{IN}$ is the digitalized voltage input.

4. The device according to claim 3, wherein for an isolated alternating current (AC) fly back configuration having the inductive element as a transformer isolating the at least one LED at the secondary end of the transformer, the reference constant K is calculated according to the following formula:

$$K = \frac{1}{2*\sqrt{L_1*L_2}}$$

wherein $L_1$ is the inductance value of the primary winding of a transformer and $L_2$ is the inductance value of the secondary winding of the transformer.

5. The device according to claim 4, wherein the transformer is a planar transformer.

6. The device according to claim 4, wherein the $T_{OFF}$ value is configured to be compared with a short circuit reference value such that in use, the $T_{OFF}$ value is less than the short circuit reference value when a short circuit is present.

7. The device according to claim 3, wherein for a non-isolated direct current (DC) fly back configuration, the reference constant K is calculated according to the following formula:

$$K = \frac{1}{L_3}$$

wherein $L_3$ is the inductance value of the inductive element in the fly back configuration.

8. The device according to claim 3, wherein the value of $T_{ON}$ is updated at each time period based on comparing a value A with a value B; the formulas of A and B are respectively:

$$A = V_{IN} * T_{ON} * T_{OFF};\text{ and}$$

$$B = (1/K) * I_{OUT} * (T_{ON} + T_{OFF} + T_{CALC})$$

wherein $T_{CALC}$ is the time after the discharge time of the inductive element to compute the formula and the switching time period of the electronic switch is the summation of $T_{ON}$, $T_{OFF}$ and $T_{CALC}$;

such that when the value of A is greater than B, the value of $T_{ON}$ is decreased by a predetermined number of clock cycles; when the value of A is smaller than B, the value of $T_{ON}$ is increased by the predetermined number of clock cycles; and when the value of A is equals to B, no change is made to $T_{ON}$.

9. The device according to claim 8, the device configured for adjustment of the electrical current as a function of temperature by means of a thermistor positioned at the junction of each LED; the device further configured to update the electrical current output via updating the predetermined number of clock cycles.

10. The device according to claim 1, wherein the electronic switch is a metal-oxide-semiconductor field-effect transistor (MOSFET), and in operation, the MOSFET is configured to work in a discontinuous mode.

11. The device according to claim 1, wherein the ADC, voltage comparator and oscillator are integrated into the IC.

12. The device according to claim 1, wherein the minimum resolution of the ADC is 8-bit.

13. A method for providing electrical current to at least one Light Emitting Diode (LED) via a switch mode power converter comprising the steps of:
(i) obtaining (a) a digitized voltage input; (b) a switching time period of an electronic switch; (c) a discharge time of an inductive element of the switch mode power converter; (d) the desired value of the electrical current; and (e) a digital reference as inputs;
(ii) calculating a switch-on time of the electronic switch at each switching time period; and
(iii) regulating the electrical current flowing into the at least one LED at each switching time period based on the switch-on time of the electronic switch; and (iv) repeating steps (i) to (iii) for each switching time period.

14. The method according to claim 13, wherein the switch-on time of the electronic switch $T_{ON}$ is calculated according to the following formula:

$$T_{ON} = \frac{I_{OUT} * T}{K * V_{IN} * T_{OFF}}$$

wherein $I_{OUT}$ is the desired electrical current; T is the switching time period of the electronic switch; K is a reference constant; $T_{OFF}$ is the switch-off time of the electronic switch at each switching time period and $V_{IN}$ is the digitized voltage input.

15. The method according to claim 14, wherein for an isolated alternating current (AC) source input having a transformer isolating the at least one LED to the secondary end of the transformer, the reference constant K is calculated according to the following formula:

$$K = \frac{1}{2*\sqrt{L_1*L_2}}$$

wherein $L_1$ is the inductance value of the primary winding of the transformer and $L_2$ is the inductance value of the secondary winding of the transformer.

16. The method according to claim 14, wherein for a non-isolated direct current (DC) fly-back configuration, the reference constant K is calculated according to the following formula:

$$K = \frac{1}{L_3}$$

wherein $L_3$ is the inductance value of an inductive element in the fly-back configuration.

17. The method according to claim 14, wherein the value of $T_{ON}$ is updated at each switching period based on comparing a value A with a value B; the formulas of A and B are respectively:

$$A = V_{IN} * T_{ON} * T_{OFF};\text{ and}$$

$$B = (1/K) * I_{OUT} * (T_{ON} + T_{OFF} + T_{CALC})$$

wherein $T_{CALC}$ is the time after the discharge time of the inductive element to compute the formula and the switching time period of the electronic switch is the summation of $T_{ON}$, $T_{OFF}$ and $T_{CALC}$;

such that when the value of A is greater than B, the value of $T_{ON}$ is decreased by a predetermined number of clock cycles; when the value of A is smaller than B, the value of $T_{ON}$ is increased by the predetermined number of clock cycles; and when the value of A equals to B, no change is made to $T_{ON}$.

18. The method according to claim 14, wherein the $T_{OFF}$ value is compared with a short circuit reference value and where $T_{OFF}$ is less than the short circuit reference value indicates that a short circuit is present.

19. The method according to claim 13, wherein the minimum resolution of the digitized voltage input is 8-bit.

\* \* \* \* \*